Dec. 20, 1960 N. W. BELL 2,965,717

PILOT SIGNAL CONTROL APPARATUS

Filed July 18, 1955 3 Sheets-Sheet 1

INVENTOR.
NORTON W. BELL

BY

Christie, Parker & Hale
ATTORNEYS

Dec. 20, 1960 N. W. BELL 2,965,717

PILOT SIGNAL CONTROL APPARATUS

Filed July 18, 1955 3 Sheets-Sheet 2

INVENTOR.
NORTON W. BELL

BY

Christie, Parker & Hale
ATTORNEYS

Dec. 20, 1960 N. W. BELL 2,965,717

PILOT SIGNAL CONTROL APPARATUS

Filed July 18, 1955 3 Sheets-Sheet 3

INVENTOR.
NORTON W. BELL

BY

Christie, Parker & Hale
ATTORNEYS

United States Patent Office 2,965,717
Patented Dec. 20, 1960

2,965,717

PILOT SIGNAL CONTROL APPARATUS

Norton W. Bell, Monrovia, Calif., assignor, by mesne assignments, to Consolidated Electrodynamics Corporation, Pasadena, Calif., a corporation of California Filed July 18, 1955, Ser. No. 522,454
13 Claims. (Cl. 179—15.5)

This invention relates to improvements in apparatus for controlling the amplitudes of signals which are conveyed through a link such as a storage medium, an electric line, or a telemetering channel.

In order to convey intelligence through such a link, the information is frequently modulated on a carrier wave for transmission through the link. After the modulated signal is conveyed through the link it is demodulated to provide signals representing the intelligence.

Such carrier systems are subject to the disadvantage that variations in the amplitude of the carrier wave affect the accuracy with which the intelligence may be reproduced. Also, variations in the transmission characteristics of the link affect the accuracy with which the intelligence may be reproduced.

Heretofore, variations in the transmission characteristics of a link have been corrected by transmitting a pilot signal through the link along with the intelligence signal and employing a variable gain device to control the amplitude of the two signals, with the variable gain device being controlled to cause the pilot signal to have substantially constant amplitude so that the amplitude of the intelligence signal is corrected to compensate for variations which are caused by changes in the transmission characteristics of the link. Such control apparatus does not compensate for inaccuracies which result from variations in the amplitude of the carrier wave or the pilot signal, and the amplitudes of the carrier wave and the pilot signal must be closely controlled if inaccuracies are to be avoided. This is particularly true in systems for conveying analog data because small changes in the data must be reproduced with accuracy.

These difficulties are overcome in the present invention by employing a pilot or reference signal for controlling the amplitude of the intelligence signal with the pilot signal having an amplitude which varies in accordance with variations in the amplitude of the carrier signal.

In accordance with the present invention, both the pilot signal and the intelligence signal are conveyed over the link, and the amplitude of the pilot signal is maintained substantially constant at some point along the link. Hence, the intelligence signal is corrected for any variations which are caused by variations in the portion of the link which precedes the control apparatus and for any variations which are caused by changes in the amplitude of the carrier signal.

In signals for conveying analog data it is frequently desirable to transmit the data in the form of suppressed-carrier signals which are modulated in accordance with the data. In such systems, a reference signal is required for demodulating the suppressed-carrier modulated signal in order to reproduce the modulation intelligence. This reference signal may be employed as the pilot signal for controlling the amplitude of the suppressed-carrier modulated signal.

The control apparatus of the present invention is particularly suitable for use in magnetic tape recording and playback apparatus because the control arrangement may be employed in the playback apparatus to correct for variations in the amplitude of the signals which are caused by variations in the speed of the tape transport system and by irregularities in the magnetic tape, as well as for variations in the amplitude of the signals which are caused by changes in the amplitude of the signal which is produced by the carrier generator. By causing the amplitude of the pilot signal to vary in accordance with the variations in the amplitude of the carrier signal, the control apparatus may be arranged to correct for any such variations and hence it is not necessary to provide close control over the amplitude of the carrier signal.

The invention is not limited to magnetic tape systems, and it may be employed in various systems which employ a storage or transmission link to convey information.

The invention is explained in detail with reference to the drawings, in which.

Figure 1:
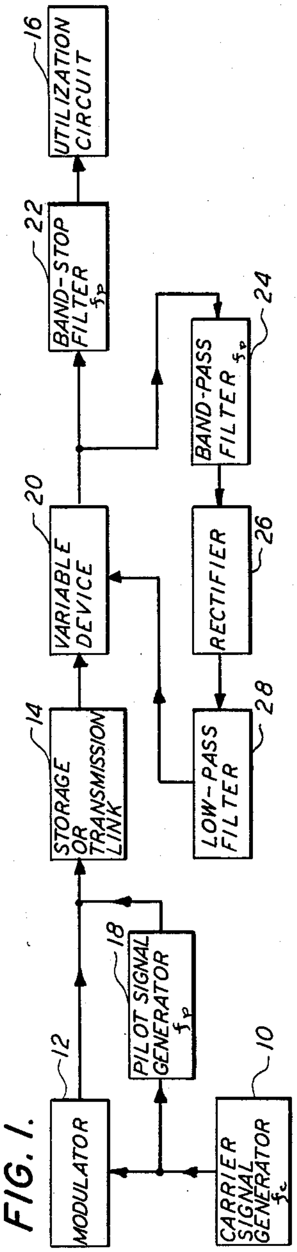
Fig. 1 is a schematic diagram showing the general application of the pilot control system of the invention.

With reference to Fig. 1, a carrier signal generator 10 provides a signal having a frequency $f_c$. A modulator 12 modulates the carrier signal in accordance with the intelligence which is to be reproduced, and the modulated signal is applied to a storage or transmission link 14 through which the modulated signal is conveyed to a utilization circuit 16. By way of example, the modulator may provide amplitude modulated signals or it may provide suppressed-carrier modulated signals. The storage or transmission link 14 may be various arrangements for conveying electric signals, such as a magnetic tape recording and playback system, an electric line, or a telemetering channel. The utilization circuit 16 may be a demodulator and a recorder.

A pilot signal generator 18 produces a pilot signal having a frequency $f_p$, and the pilot signal is applied through the link 14 along with the modulated signal. The pilot signal has a frequency which is different from the frequency band of the modulated signal. The pilot signal generator is coupled to the carrier signal generator and it provides a pilot signal having an amplitude which varies in accordance with the amplitude of the carrier signal.

A variable device 20 is located between the link 14 and the utilization circuit 16 for controlling the amplitudes of the pilot and the modulated signals. By way of example, the variable device may be a variable gain amplifier, a varistor compandor, or transformers having their phasing controlled by variable resistance elements.

The output of the variable device is applied to a band-stop filter 22 which provides high attenuation for the pilot signal but which conveys the modulated signal to the utilization circuit 16. The output of the variable device 20 is also applied to a band-pass filter 24 which serves to convey the pilot signal and to provide high attenuation for the frequency band of the modulated signal. The output of the band-pass filter 24 is applied to a rectifier 26, and the output of the rectifier is applied through a low-pass filter 28 to control the variable device. The low-pass filter 28 is tuned to pass the frequency range over which control action is desired. The frequency range is dependent upon the time duration of the variations which are to be controlled, and these time durations are determined by the characteristics of the link 14.

The signal which is conveyed through the low-pass filter 28 is employed to control the variable device 20 so as to cause the pilot signal to have substantially constant amplitude at the output of the variable device, thereby compensating for undesired variations in the amplitude of the modulated signal. Thus, the pilot signal control arrangement serves to compensate for variations in the amplitude of the carrier signal produced by the carrier signal generator and for variations in the amplitudes of the two signals which are caused by changes in the link 14.

It is difficult to record and reproduce analog data on magnetic tape because variations in the characteristics of the magnetic tape introduce inaccuracies. The inaccuracies which are caused by the variations in the characteristics of the magnetic tape are small, and hence they are not important when magnetic tape is employed to record and reproduce sound or the like. However, when the magnetic tape is employed to record and reproduce analog data, these small inaccuracies are important and it is desirable to avoid them. The control arrangement of the present invention may be employed to compensate for such inaccuracies, and a typical arrangement is illustrated in Figs. 2 and 3.

Figure 2:
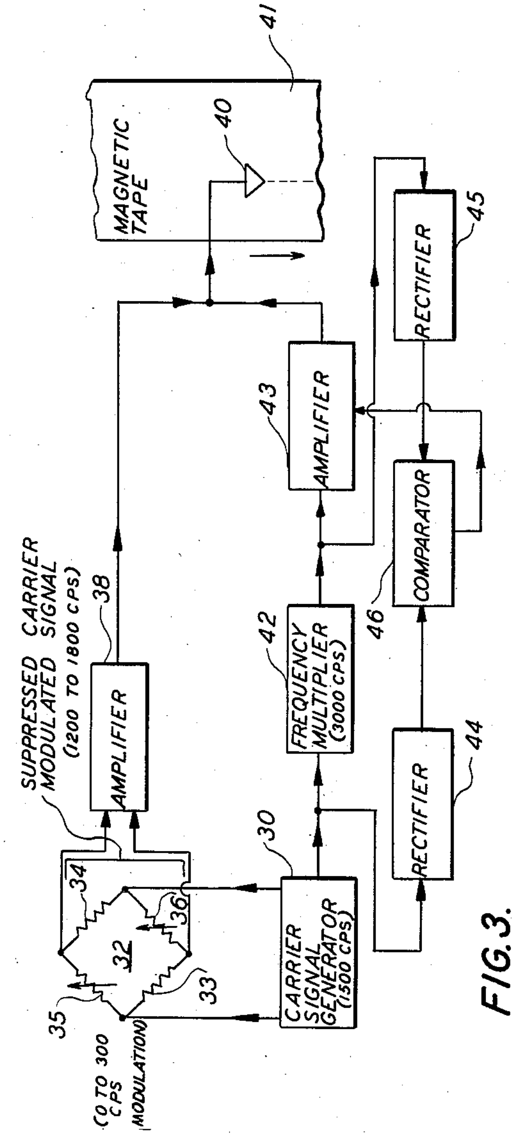
Figs. 2 and 3 show how the invention may be employed in a magnetic tape recording and reproducing system.
Figure 3:
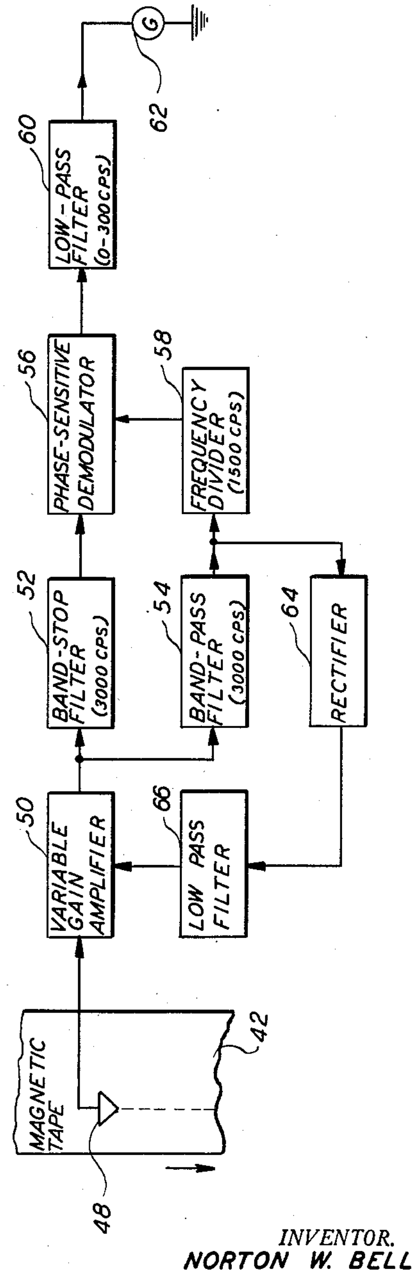

Fig. 2 illustrates an arrangement for recording analog data upon magnetic tape. A carrier signal generator 30 provides a carrier wave which is applied to a four-arm transducer 32. This transducer is provided with a pair of arms 33 and 34 which have substantially constant resistance, and with a pair of arms 35 and 36 having resistances which vary in accordance with the analog data which is to be recorded. A bridge circuit of this type produces a suppressed-carrier signal which is modulated in accordance with the data which is to be reproduced.

The suppressed-carrier modulated signal is applied through an amplifier 38 to a recording head 40 which serves to record the signal on magnetic tape 41.

A reference signal is required for demodulating the suppressed-carrier modulated signal, and the reference signal is provided by a frequency multiplier 42 which provides a multiplied version of the carrier signal frequency. The output of the frequency multiplier is applied to the recording head 40 through an amplifier 43 so that the reference signal is recorded along with the suppressed-carrier modulated signal.

The reference signal which is provided by the frequency multiplier 42 is employed in the playback apparatus as the pilot signal for control purposes, and it is desirable that the reference signal have an amplitude which varies in accordance with variations in the amplitude of the carrier signal. By way of example, this may be achieved by controlling the gain of the amplifier 43 in accordance with the amplitude of the carrier signal. In the arrangement illustrated in Fig. 2, the carrier signal and the reference signal are applied through rectifiers 44 and 45 to a comparator 46 which controls the gain of the amplifier in accordance with the difference between the amplitude of the carrier signal and the amplitude of the reference or pilot signal.

Typical frequencies have been shown on the drawings in order to illustrate the invention, but it will be apparent that various other frequency arrangements may be employed if desired. If the carrier signal generator produces a carrier signal having a frequency of 1500 cycles per second, and if the intelligence which is to be reproduced has a frequency range which varies between 0 and 300 cycles per second, the suppressed-carrier modulated signal will have a frequency band of 1200 to 1800 cycles per second. A frequency doubler may be employed in such an arrangement for providing the reference signal since the reference signal will have a frequency of 3000 cycles per second, which falls outside the frequency band of the modulated signal.

After the intelligence signal and the reference signal have been recorded on the magnetic tape by the apparatus of Fig. 2, it may be played back by the apparatus of Fig. 3. The recorded signals are read by a reading head 48 and the output of the reading head is applied through a variable gain amplifier 50 to a band-stop filter 52 and a band-pass filter 54. The band-stop filter 52 serves to stop the reference signal and to pass the suppressed-carrier modulated signal to the demodulator 56. The band-pass filter 54 serves to pass the reference signal and to stop the suppressed-carrier modulated signal so that only the reference signal appears at its output. The reference signal is applied to a frequency divider 58 which converts the reference signal to the frequency of the original carrier signal. The output of the frequency divider 58 is applied to the demodulator 56. The demodulator 56 produces an output signal which varies in accordance with the original modulation, and this signal may be applied through a low-pass filter 60 to a galvanometer 62 or to any other suitable utilization device.

The reference signal which is required for demodulating the suppressed-carrier modulated signal is also employed to control the amplitude of the suppressed-carrier modulated signal which is applied to the demodulator 56. The reference signal which is derived at the output of the band-pass filter 54 is applied to a rectifier 64, and the output of the rectifier is applied through a low-pass filter 66 to control the gain of the variable gain amplifier 50. The variable gain amplifier 50 is controlled so as to cause the reference signal to have substantially constant amplitude at the output of the variable gain amplifier, and hence it controls the amplitude of the suppressed-carrier modulated signal so as to compensate for variations which are caused by irregularities in the magnetic tape, by changes in the speed of the magnetic tape, and by changes in the amplitude of the signal which is produced by the carrier signal generator.

As discussed above, the frequency range of the low-pass filter is determined by the time duration of the variations which are to be corrected. In this embodiment of the invention the time duration of the undesired variations is largely determined by the characteristics of the magnetic tape and by the speed at which it is moved during recording and playback.

Figure 4:
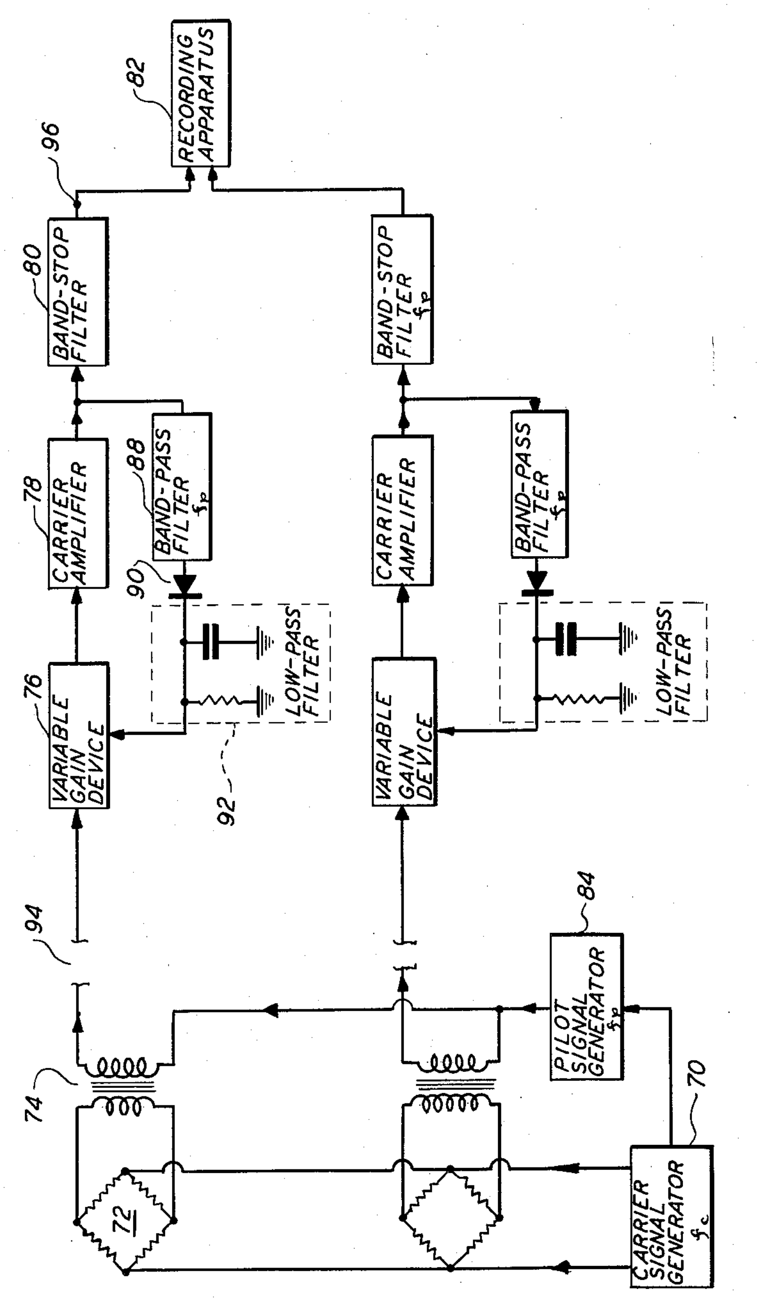
Fig. 4 shows how the invention may be employed when an electric line is employed as the transmission link.

Fig. 4 illustrates how the techniques of the present invention may be employed in a system in which the transmission link is an electric line. Two links are illustrated in the drawing, but it will be apparent that any number of links may be employed if desired. Only one link will be described since the two links are the same.

A carrier signal generator 70 produces a carrier signal having a frequency $f_c$. A transducer 72 produces modulated signals which are modulated in accordance with the intelligence which is to be reproduced. Either amplitude or suppressed-carrier modulation may be employed. The output of the transducers is applied through a transformer 74 to a variable gain device 76. The output of the variable gain device is applied through an amplifier 78 and a band-stop filter 80 to recording apparatus 82. The variable gain device 76 and the amplifier 78 may be combined if desired.

A pilot signal generator 84 serves to produce a pilot signal having a frequency signal $f_p$. The pilot signal generator 84 is coupled to the carrier signal generator 70, and the amplitude of the pilot signal is varied in accordance with variations in the amplitude of the carrier signal. The amplitude of the pilot signal may be controlled by the specific arrangement illustrated in Fig. 2 if desired.

The pilot signal is applied through the variable gain device along with the modulated signals so that both of the signals are applied through the variable gain device. The band-stop filter 80 is tuned to stop the pilot signal and to convey the modulated signal to the recording apparatus. A band-stop filter 88 is coupled to the output of the carrier amplifier 78, and it is tuned to pass the pilot signal and to stop the modulated signal. The output of the band-pass filter 88 is applied to a rectifier 90 and a low-pass filter 92 to control the gain of the variable gain device 76. As before, the variable gain device is controlled so as to cause the pilot signal to have substantially constant amplitude at the output of the variable gain device and hence the variable gain device also controls the amplitude of the modulated signal so as to compensate for changes in the amplitude of the carrier signal and for variations in the electrical system which is located between the variable gain device and the carrier signal generator.

An electric line or a telemetering channel may be located at the position 94 or at the location 96. It is preferable that the electric line or telemetering channel be located at the position 94 so that the control apparatus will compensate for variations in the electric line or in the telemetering channel.

If the recording apparatus 82 is located adjacent the transducers, the electric line which interconnects the transformer 74 and the variable gain device 76 may be a short electric conductor.

Figure 5:
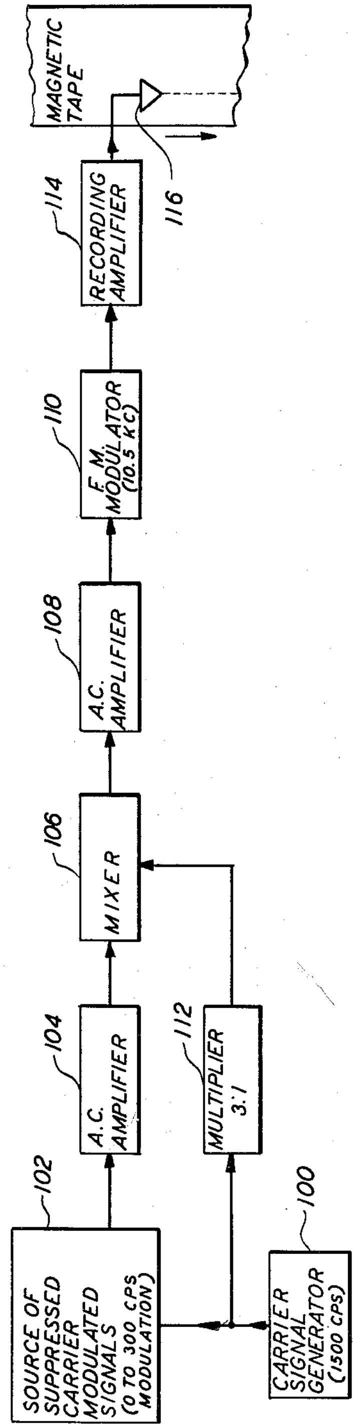
Figs. 5 and 6 show how the invention may be employed in a tape system in which information is recorded in the form of frequency-modulated signals.
Figure 6:
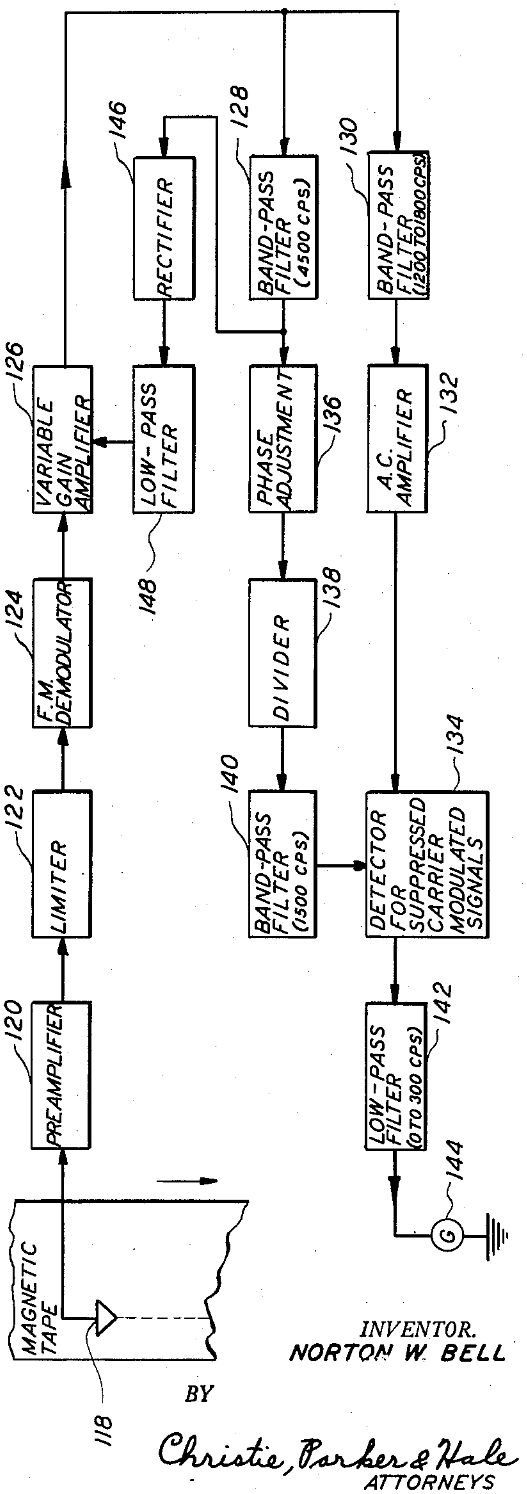

Figs. 5 and 6 show how the techniques of the present invention may be employed in a magnetic tape recording and playback system wherein the intelligence signal and the reference signal are recorded in the form of frequency-modulated signals on the magnetic tape.

A carrier signal generator 100 produces a carrier signal, ad this signal is applied to a source 102 which produces a suppressed-carrier signal which is modulated in accordance with the intelligence which is to be reproduced. By way of example, the source 102 of suppressed-carrier modulated signals may be the bridge transducer arrangement 32 of Fig. 2.

The suppressed-carrier modulated signal is applied through an A.C. amplifier 104, a mixer 106, and an A.C. amplifier 108 to an F.M. modulator 110.

A multiplier 112 provides a multiplied version of the carrier signal and this is applied to the mixer 106. Preferably, the amplitude of the reference signal which is produced by the multiplier 112 varies in accordance with variations in the amplitude of the carrier signal. This may be achieved by employing the technique discussed above with reference to Fig. 2, or any other suitable arrangement.

Thus, the reference signal which is produced by the multiplier 112 and the suppressed-carrier modulated signal which is produced by the source 102 are both applied to the F.M. modulator 110, and the output of the F.M. modulator is applied through a recording amplifier 114 to a recording head 116 which records these two signals along the same track on magnetic tape.

The modulation technique which is employed in the apparatus of Fig. 5 is sometimes referred to as "compound modulation." This is because the intelligence to be reproduced is first modulated on a suppressed-carrier signal and then the suppressed-carrier modulated signal is applied to a frequency modulator which provides a frequency-modulated version of the suppressed-carrier modulated signal.

Fig. 6 illustrates an arrangement for playing back magnetic tape carrying information which was recorded by the apparatus of Fig. 5. The tape is passed adjacent a reproducing head 118 which provides output signals in accordance with the magnetically recorded signals on the tape.

The output of the reproducing head is applied through a preamplifier 120 and a limiter 122 to an F.M. demodulator 124 which converts the frequency-modulated signals to the suppressed-carrier modulated signal and the reference signal. The output of the demodulator is applied through a variable gain amplifier 126 to band-pass filters 128 and 130. The band-pass filter 128 is tuned to pass the reference signal and to reject the suppressed-carrier modulated signal. The band-pass filter 130 is tuned to pass the suppressed-carrier modulated signal and to reject the reference signal.

The suppressed-carrier modulated signal is applied through an A.C. amplifier 132 to a detector 134 for demodulating the suppressed-carrier modulated signals.

A reference signal having the same frequency and phase as the original carrier signal is required by the demodulator 134 in order to demodulate the suppressed-carrier modulated signal. This reference signal is provided by a phase adjustment 136, a divider 138 and a band-pass filter 140 which is tuned to pass the carrier frequency.

The output of the demodulator 134 represents the original intelligence which was presented in suppressed-carrier modulated form. This output signal may be applied through a low-pass filter 142 which is tuned to pass the frequency of the intelligence to be reproduced and the output of the filter 142 may be applied to any suitable reproducing device such as the galvanometer 144.

The reference signal which is required for demodulating the suppressed-carrier modulated signal serves as the pilot signal for controlling the variable gain amplifier 126. This signal is derived at the output of the band-pass filter 128 and it is applied through a rectifier 146 and a low-pass filter 148 to control the action of the variable gain amplifier 126 so as to cause the reference signal to have substantially constant amplitude at the output of the variable gain amplifier. Since both the intelligence signal and the reference signal are applied through the variable gain amplifier 126, control of the reference signal also controls the intelligence signal so as to compensate for undesired variations such as may be caused by variations in the amplitude of the signal produced by the carrier signal generator 100, variations in the speed of the magnetic tape, and variations in the characteristics of the magnetic tape.

The frequencies for a specific arrangement of the recording and reproducing apparatus of Figs. 5 and 6 are illustrated in the drawings. It will be apparent that various other frequency arrangements may be employed.

A control arrangement which is similar to that disclosed in Figs. 5 and 6 is disclosed and claimed in co-pending patent application Serial No. 522,696, which was filed on July 18, 1955, in the name of Clifford E. Berry.

I claim:

1. In a carrier system having modulating means for modulating a carrier signal in accordance with information signals to produce a modulated signal, a circuit for utilizing the modulated signal, and a link intercoupling the output of the modulating means and the utilizing circuit for conveying the modulated signal, the improvement which comprises means responsive to the carrier signal before the carrier signal is modulated for generating a pilot signal whose amplitude varies with changes in the amplitude of the unmodulated carrier signal, means for conveying the pilot signal through the intercoupling link, variable means located at the intercoupling link for controlling the amplitude of the signals which are conveyed by the link, and means selectively responsive only to the amplitude of the pilot signal which is conveyed by the intercoupling link for controlling the variable means to cause the pilot signal to have substantially constant amplitude and thereby compensate for undesired variations in the amplitude of the modulated signal.

2. The apparatus of claim 1 in which the intercoupling link is a storage medium and means for reproducing the information which is stored in the storage medium.

3. The apparatus of claim 1 in which the intercoupling link is a magnetic tape recording and playback system.

4. The apparatus of claim 1 in which the intercoupling link is an electric line.

5. In a carrier system having modulating means for modulating a carrier signal in accordance with information signals to produce a modulated signal, means responsive to the modulated signal for reproducing the information, and a link intercoupling the output of the modulating means and the input of the reproducing means, the improvement which comprises a pilot signal generator responsive to the carrier signal before the carrier signal is modulated for generating a pilot signal having a frequency which is outside the frequency band of the modulated signal and whose amplitude varies with changes in the amplitude of the unmodulated carrier signal, means for conveying the pilot signal through the intercoupling link, a variable device located at one end of the intercoupling link for controlling the amplitude of the signals which are conveyed by the intercoupling link, and means selectively responsive only to the amplitude of the pilot signal which is conveyed by the link for controlling the variable device to cause the pilot signal to have substantially constant amplitude and thereby compensate for undesired variations in the amplitude of the modulated signal.

6. In a carrier system for conveying information having a carrier signal generator, and means coupled to the carrier signal generator for producing a suppressed-carrier signal which is modulated in accordance with the information, the improvement which comprises means coupled to the carrier signal generator for producing a pilot signal having a frequency which is different from the frequency band of the suppressed-carrier modulated signal and having an amplitude which varies in accordance with variations in the amplitude of the carrier signal, means for simultaneously recording the modulated signal and the pilot signal on magnetic tape, a playback system for reproducing the signals which are recorded on the magnetic tape, a variable device located in the input circuit for the playback system for controlling the amplitude of the signals which are conveyed through the variable device, and means responsive to the amplitude of the pilot signal which is conveyed through the variable device for controlling the gain of the variable device to cause the pilot signal to have substantially constant amplitude at the output of the variable device so as to compensate for variations in the amplitude of the signals which are caused by irregularities in the magnetic tape, by changes in the amplitude of the signal which is produced by the carrier signal generator, and by changes in the speed of the magnetic tape.

7. In a carrier system having means for producing a suppressed-carrier signal modulated in accordance with information to be reproduced, means for producing a reference signal having a predetermined frequency and phase relationship with respect to the carrier and also having an amplitude which varies in accordance with variations in the amplitude of the carrier, means for recording the suppressed-carrier modulated signal and the reference signal on magnetic tape, and a playback system for reproducing the signals which are recorded on the magnetic tape and for demodulating the suppressed-carrier modulated signal, the improvement which comprises a variable device located in the playback system for controlling the amplitudes of the suppressed-carrier modulated signal and the reference signal, and means responsive to the amplitude of the reference signal for controlling the variable device to cause the reference signal to have substantially constant amplitude at the output of the variable device and to thereby control the amplitude of the suppressed-carrier modulated signal to compensate for variations in the amplitude of the signal which are caused by irregularities in the magnetic tape, by changes in the amplitude of the carrier signal, and by changes in the speed of the magnetic tape.

8. A signal storage system for storing and reproducing intelligence signals and a pilot control signal including means for generating a carrier signal, means for modulating the carrier signal in accordance with information to be stored, means responsive to the carrier signal before the carrier signal is modulated for generating a pilot signal whose amplitude varies with changes in the amplitude of the unmodulated carrier, a magnetic storage medium, means responsive to the modulated carrier and the pilot signal for simultaneously storing the modulated carrier and the pilot signal in the same location in said magnetic storage medium, means associated with the magnetic storage medium for reproducing the modulated carrier and the pilot signal stored in said magnetic storage medium, variable means responsive to the modulated carrier and the pilot signal derived from the storage medium for controlling the amplitude thereof, means responsive to the output of the variable means for separating the pilot signal and the modulated carrier signal, control circuit means responsive to the reproduced pilot signal from the separating means for providing a control signal to said variable means which causes the pilot signal to have substantially constant amplitude and thereby compensate for undesired variations in the amplitude of the modulated carrier, and means for extracting information from the modulated carrier.

9. A signal storage and reproducing device for storing intelligence signals and a pilot control signal including means for generating a carrier signal, means for modulating the carrier signal in accordance with information to be stored, means responsive to the carrier signal before the carrier signal is modulated for generating a pilot signal whose amplitude varies with changes in the amplitude of the unmodulated carrier, a signal storage device, means responsive to the modulated carrier and the pilot signal for simultaneously storing the modulated carrier and the pilot signal in the same location in said signal storage device, means associated with the signal storage device for reproducing the modulated carrier and the pilot signal stored therein, means responsive to the reproduced modulated carrier and the pilot signal for controlling the amplitude of the modulated carrier in accordance with the amplitude of the pilot signal, whereby undesired variations in the amplitude of the modulated carrier are compensated.

10. The apparatus of claim 9 wherein said last named means includes variable means responsive to the modulated carrier and the pilot signal for controlling the amplitude thereof, and control circuit means responsive to the pilot signal for providing a control signal to said variable means which causes the pilot signal to have substantially constant amplitude and thereby compensate for undesired variations in the amplitude of the modulated carrier.

11. The apparatus of claim 10 wherein said means for producing a pilot signal supplies an output signal having a frequency which is outside the frequency band of the modulated carrier signals.

12. The apparatus of claim 11 wherein suppressed-carrier modulation is employed and the frequency of the pilot signal is a multiple of the carrier signal frequency, a mixer connected to receive the pilot signals and the suppressed-carrier modulated signals and provide the mixed signals as an output to said means responsive to the modulated carrier and the pilot signal for simultaneously storing them in said signal storage device.

13. The apparatus of claim 12 including a frequency modulator which is modulated with the mixed pilot signal and suppressed-carrier modulated signals, whereby compound modulation signals are stored in said signal storage device.

References Cited in the file of this patent

UNITED STATES PATENTS

| | | |
|---|---|---|
| 2,547,024 | Noble | Apr. 3, 1951 |
| 2,573,279 | Scherbatskoy | Oct. 30, 1951 |
| 2,671,166 | O'Brien | Mar. 2, 1954 |
| 2,757,239 | Patton | July 31, 1956 |
| 2,781,417 | Bower | Feb. 12, 1957 |
| 2,791,640 | Wolfe | May 7, 1957 |
| 2,868,890 | Camras | Jan. 13, 1959 |

UNITED STATES PATENT OFFICE
CERTIFICATION OF CORRECTION

Patent No. 2,965,717 December 20, 1960

Norton W. Bell

It is hereby certified that error appears in the above numbered patent requiring correction and that the said Letters Patent should read as corrected below.

Column 8, line 41, strike out "and reproducing" and insert the same after "storing", same line.

Signed and sealed this 6th day of June 1961.

(SEAL)
Attest:

ERNEST W. SWIDER
Attesting Officer

DAVID L. LADD
Commissioner of Patents